United States Patent [19]

Domer

[11] 3,840,126
[45] Oct. 8, 1974

[54] VEHICHLE COUPLING SYSTEMS, ESPECIALLY FOR RAILWAYS

[75] Inventor: Michel Domer, Montigny les Cormeilles, France

[73] Assignee: Paulstra, Levallois Perret, France

[22] Filed: Feb. 5, 1973

[21] Appl. No.: 329,830

[30] Foreign Application Priority Data
Feb. 22, 1972 France .............................. 72.5907

[52] U.S. Cl. ....................... 213/45, 213/46, 213/67
[51] Int. Cl. ......................... B61g 9/06, B61g 11/08
[58] Field of Search .............. 213/45, 46, 47, 67, 69

[56] References Cited
UNITED STATES PATENTS

| | | | |
|---|---|---|---|
| 2,197,030 | 4/1940 | Clark | 213/46 R |
| 2,553,636 | 5/1951 | Dath | 213/45 |
| 2,650,720 | 9/1953 | Danielson | 213/45 |
| 2,934,216 | 4/1960 | Campbell | 213/45 |
| 3,160,285 | 12/1964 | Sinclair et al. | 213/45 |
| 3,185,317 | 5/1965 | Willison | 213/45 |
| 3,637,088 | 1/1972 | Bremond | 213/46 A |

Primary Examiner—Drayton E. Hoffman
Attorney, Agent, or Firm—Larson, Taylor & Hinds

[57] ABSTRACT

The system comprises two stacks of elastic plates interposed between support plates. A U-shaped part is provided, fast to one plate and enclosing a part of the stacks, the whole being subject to the effect of buff or draft through a shackle and a buffing part. The assembly is mounted in a casting on the edges of which the plates are supported, the U-shaped part ensuring resistance to buffing by means of guidance against the walls of the casing. A linking element is provided between the support plates, being fixed to one plate and slidable in the other.

8 Claims, 5 Drawing Figures

VEHICHLE COUPLING SYSTEMS, ESPECIALLY FOR RAILWAYS

The invention relates to coupling systems for vehicles, more especially railway vehicles, in particular to automatic coupling systems, of the type comprising elastic damping devices arranged in the form of stacks of plates of elastomeric material such as rubber.

In known systems of this type, such as for example those described in U.S. Pat. No. 3,637,088 and divisional application Ser. No. 193,363 now abandoned of applicant, it has to be taken into account that under the effect of axial loads transmitted to the stack of plates of the damping device, there is a risk that oblique components may occur, which would tend to make said stack "buckle," and introduce transverse reactions (in the vertical plane and especially in the horizontal plane) capable of compromising the stability of the vehicles on the track, and even, in extreme cases, of causing derailments, especially in the case of buffering.

There have already been proposed various guide means tending to counteract this buckling, but these means are found to be insufficient. Moreover, they were generally provided externally to the damping device proper, that is to say belong to the coupling head cooperating with said device, this head having therefore to be arranged in a certain manner.

It has been envisaged, according to the invention, to incorporate said guide means with the damping device proper, independently of the coupling head which can hence be of any suitable known type.

In particular, said guide means, which have to be made to cooperate with the damping device — which comprises at least one unit of elastomeric plates between two metallic supports or end support plates — consists in incorporating with the front support plate an armature constituting with this plate a sort of U of which the wings ensure the guidance, especially by being supported against the shackle of the coupling head and against the walls of the casing of the vehicle inside of which the damping device is mounted.

In addition, advantageously, a rectilinear sliding connection is formed between the other support plate and the wings of the U-shaped device, this connection being formed by suitable bars.

This feature applies more especially to the case which will be studied below purely by way of example, wherein the elastic unit is divided between two elemental units, on both sides of an intermediate support plate, the assembly being especially such that, for one of the two operations (draft and buff), especially for draft, one of the units is inactive.

In the latter case, recourse is had to connecting bars which, on one hand, are connected in sliding manner to the opposite support plate to that which is fast to the U-shaped guide device and on the other hand, are fixed to the intermediate support plate, thereby being finally connected also in sliding manner to the wings of the U-shaped member.

These connecting bars, apart from the contribution that they make, in combination with the U-shaped guide device, to counteract buckling of the units, serve also, being urged by the head of the coupling shackle in the case where the coupling is subject to draft, to eliminate the corresponding elemental unit, whilst, in the direction of buff, they do not counteract the compression of said unit, since they are mounted slidably in the corresponding end support plate.

This latter feature enables the placing out of action of the elemental unit to be ensured without requiring a special configuration of the shackle and of the coupling head.

In a general way, the assembly of the elastic damping device thus constructed and of its guide means will be introduced, with the shackle of the coupling head, and in a prestressed state of the rubber, into the casing formed to receive it in the vehicle, so that the two end support plates become supported against the corresponding edges of said casing.

For maintaining said prestressing, on mounting, within dimensions enabling the easy introduction of the assembly into said casing, there are engaged between certain parts of the assembly, according to another feature of the invention, wedging means, for example balls or rollers, assuring the maintenance of said dimensions, which means will be automatically removed by a thrust applied to the damping assembly, for example on the first buff exerted between the coupled vehicles.

The invention consists, apart from these features, of certain other features which are preferably used at the same time and which will be more explicitly considered below.

It relates more particularly to certain types of application (especially those in which it is applied to systems of the type concerned for railway vehicles) as well as to certain embodiments, of said features; and it relates, more particularly again and this by way of new industrial products, to systems of the type concerned including the application of these same features, as well as the special elements adapted for their construction and vehicles including them.

The invention will in any case be well understood by means of the further description below, as well as of the accompanying drawings, which description and drawings are of course given primarily by way of indication.

Figure 5:
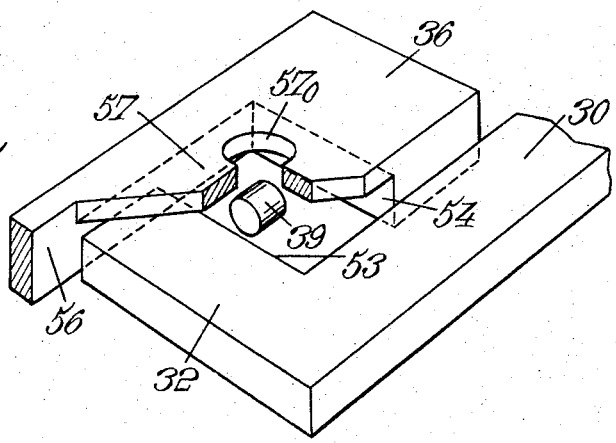

FIG. 5, lastly, shows also separately and in perspective other details of construction.

According to the invention and more especially according to that of its types of application as well as according to those embodiments of its various parts, to which it would appear that preference should be given, in order for example to construct a coupling system with a damper, procedure is as follows or in a similar manner.

As regards firstly the portion of the coupling system, intended to transmit buff and thrust from one to the other of the coupled vehicles, they are arranged in any suitable known manner. It is therefore not considered necessary to describe them and sufficient to show in the drawings the two essential parts of this coupling portion, that is to say the shackle such as 4, of which the base such as 22 will be adapted, on draft applied to the coupling, to become supported against one end of the elastic damping device which will be discussed, whilst another part 3, connected in suitable manner to the shackle, will be adapted, on buff applied to the coupling, to become supported against the other end of said device, any conventional solution being usable for this purpose.

Figure 2:
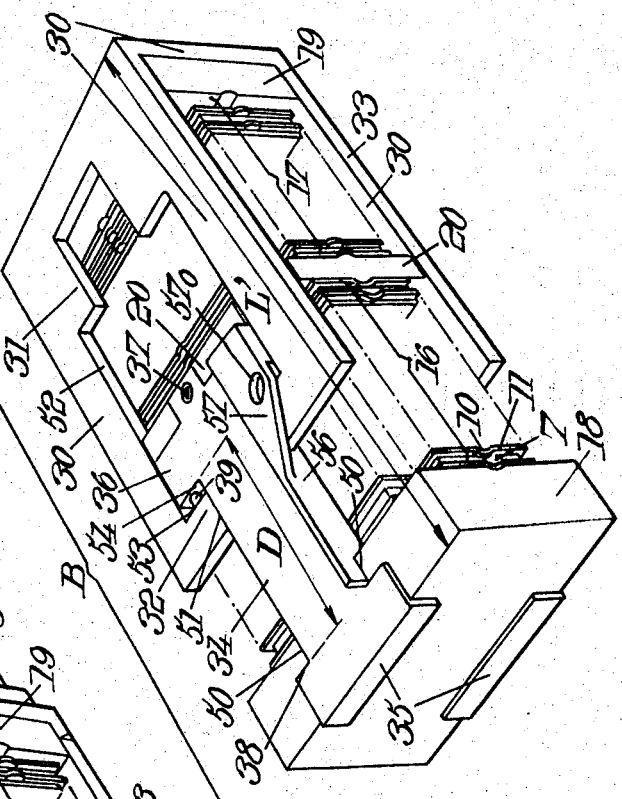
FIG. 2 shows in perspective the whole of the system illustrated in FIG. 1 as it appears once mounted.

As regards more especially the damping device, it is essentially constituted by a unit B (FIGS. 2 and 3) of stacked elastic elements or plates, or rather, by two elemental units 16, 17 (FIG. 3) of such plates, the assembly being especially such, as is known, that these two units are compressed against one another on buff applied to the coupling, whilst only one of them is compressed, on draft applied to the coupling.

The plates 7 are of any suitable type, for example, of rectangular shape, advantageously with slots (not shown in the drawing), especially in the direction of the longest side of the rectangle, to increase the case of elastic compression, these plates being separated by metallic reinforcing inserts 11. The said inserts advantageously include ribs 10 cooperating with corresponding grooves or projections of the elastic plates, to ensure good positioning.

The two elastic units 16 and 17 thus constructed are arranged so as to be supported, at their ends, respectively on the two end metallic support plates 18 and 19 and on an intermediate common plate 20.

Figure 1:
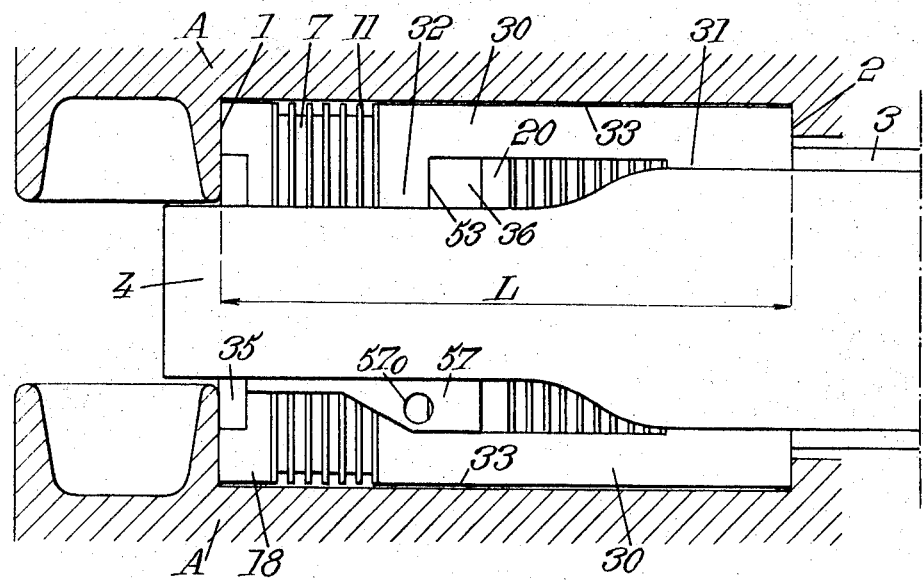
FIG. 1 shows in very diagrammatic plan view one embodiment of the whole of a coupling system, with dampers, according to the invention, mounted in a casing belonging to a vehicle.

The assembly of such a unit B (unit 16 + unit 17), brought to a suitable prestressed condition, and mounted in the above-mentioned shackle 4, to receive buff and draft, will be housed inside a casing A (FIG. 1) incorporated in the chassis of the vehicle, the whole in such a way that the end support plates 18 and 19 become supported against the respective walls 1 and 2 of this casing. In the absence of forces on the coupling, precompression of the units 16 and 17 holds them respectively in contact with these walls 1 and 2. Under the action of a draft force applied through the bottom 22 of the shackle to the support plate 18, the latter leaves its supports 1 by compressing the unit (it will be seen below that only the unit 17 is compressed). Under the action of a buffing force applied at 3, the support plate 19 receiving this force leaves its supports 2, thereby compressing the two units 16 and 17.

The construction of the units being thus defined (and it being understood that any other embodiments could be provided), there are combined with these units, to avoid lateral reactions, guide means consisting essentially of a U-shaped reinforcement system partially surrounding said units, and fast to the front support plate 19.

Figure 3:
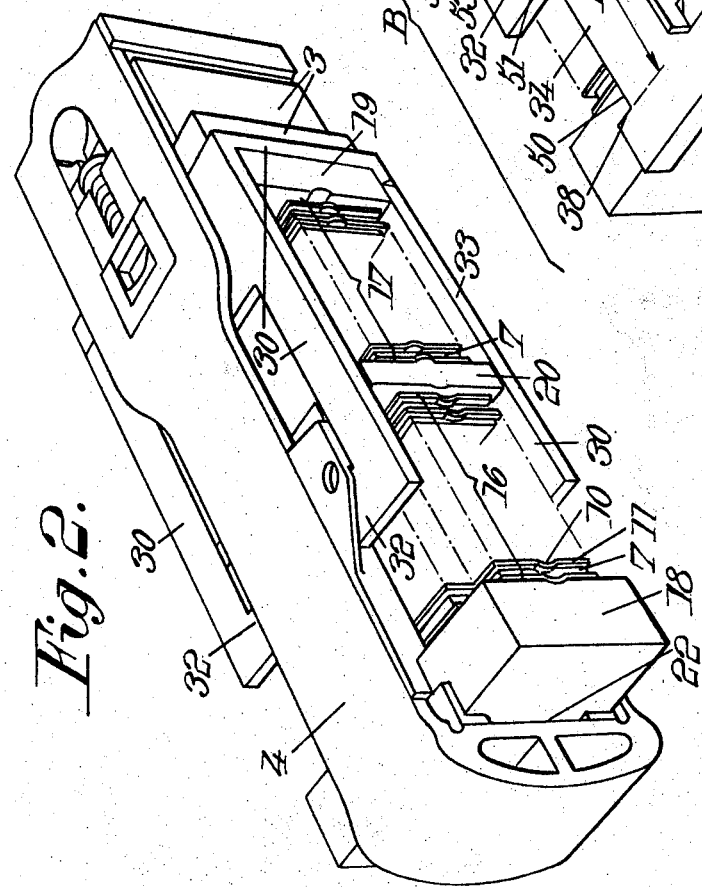
FIG. 3 shows in perspective view the assembly or block of the damping device such as it appears before mounting in its shackle.

It is seen in FIG. 3, which shows the separate damping block, before mounting, that the head plate 19 is fast to two flat and horizontal wings 30, of substantial length, extending beyond the intermediate support plate 20. In this way, there is indeed obtained a type of U of which the flat and horizontal arm such as 31, 32 will come to slide, once the mounting is effected in the shackle 4 (FIG. 2), against the inner surfaces of this shackle (vertical guidance) whilst the lateral arms 33 of said wings will be able to come, after mounting in the casing A, to slide against the corresponding vertical flat surfaces of the walls of said casing (horizontal transverse guidance). The guidance is hence complete and counteracts buckling of the unit 16, 17.

However it is advantageous to complete this assembly by additional means contributing to further reinforce guidance and to enable in addition the obtaining of precompression of said units more easily, before mounting in the casing.

These means consist of bars or barlets 34 which, fixed on the intermediate support plate such as 20, can at the same time slide in the arms 30, 31, 32 of the U and in the end support plate 18.

Thus these barlets 34, of thick sheet metal, can terminate in the shape of a T at each of their ends. On the side of the end support plate 18, each bar slides at 50 in said plate and, in addition, its T-shaped end 35 becomes freely engaged under the effect of the precompression of the damping device (and the absence of a thrust on the coupling), behind the plate 18 at 38, this however without opposing the separation of these parts when a thrust exerted on the coupling increases the compression of the units. At the front, each bar, of which the body slides at 51 between the corresponding arms 32 of the wing of the U-shaped device, comprises also a T-shaped end 36, of which the edges also slide against the support surfaces 52 formed in the wing, the whole ensuring rectilinear guidance. In addition, the T-shaped end 36 comes normally on mounting, under the action of the precompression, to be engaged behind the inner edges 53 of the arms 32. Lastly, said bar 34, 36 is fixed at 37, for example by screws, on the intermediate support plate 20.

Figure 4:
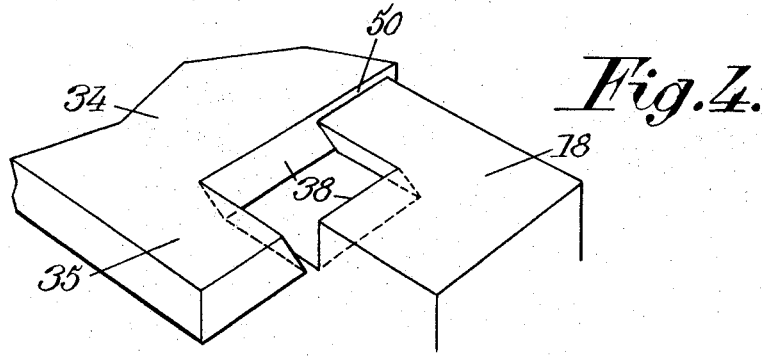
FIG. 4 shows separately in perspective certain details of construction.

It will hence be understood that said bars play a first role of guidance, but that in addition, through their active length D suitably chosen (length taken between the support for engagement surfaces 38 and 53 abovementioned), they can play a second role, that is to say a role of maintaining the precompression of the units 16 and 17. In otherwords, on mounting, the cartridge B is first compressed in a press such as shown in FIG. 3 and the bars 34 are engaged to keep this precompression after liberation from the press, and thus to enable mounting in the casing A, as explained below. The surfaces 38 (FIG. 4) are in reverse slope to maintain the stability of the assembly and to produce a type of hitching.

In reality, it is arranged so that the length L' of the unit B, before mounting in the casing A of length L, is provisionally a little less than L, to facilitate the introduction, this by insertion of provisional wedging means between certain of the support surfaces of the abovesaid bars 34.

Thus these means could be constituted by balls or roller (shims, etc.) such as shown at 39 in FIGS. 3 and 5, these means being for example inserted between the corresponding support surfaces 53 and 54 of the T-shaped ends and the arms 34 of the wings 30. In the facing edges there can be provided hollows to receive the above-mentioned balls or rollers.

On mounting, that is to say after introduction of the unit B of FIG. 3 into the casing A, with its shackle 4, the abovementioned wedging means will be lifted out, to ensure the passage from the length L' to the length L and to enable free contact of the end support plates 18 and 19 against the corresponding surfaces 1 and 2 of the casing. This can occur automatically on the first buff or draft effected on the coupling hook, having the effect of separating the surfaces 53, 54, hence of causing the balls or the like 39, to fall, which thus cease to exert their effect.

Besides these two roles of guidance and of holding the initial prestressing for mounting, the bars such as 34 play a third role: that of keeping the unit 16 inactive on the operation of the coupling in draft. In this case, in fact, the bottom 22 of the shackle exerts its action on the end support plate 18 and, at the same time, on the T-shaped ends 35 of the bars 34. Through this fact, the draft force is transmitted through the said bars 35 directly to the intermediate support plate 20, so that the elemental unit 16 is placed out of action and the draft effect is damped only by the unit 17.

This isolation of one of the units is hence effected in the damping cartridge B itself, independently of the shackle 4, whilst in existing devices, such as especially those described in the abovesaid prior patent, this isolation necessitates a special configuration of the shackle 4.

Finally, the whole is also advantageously completed by stiffening means for the bars or barlets 34, to enable them to contain the forces better. These means comprise for example a stiffening edge 56, 57, which edge is provided on a single side in order not to interfere with the introduction of the cartridge into the shackle 4 on mounting. A hole $57_0$ is provided for the passage of the ball or roller 39 at the moment when the prestressing is adjusted in the press.

As a result of which it is possible to construct an assembly of which the operation can be summarized in the following manner.

For the assembly, having subjected the unit B (FIG. 3) to precompression, with the insertion of the wedging balls or rollers 39, this unit is introduced inside the shackle 4, then the assembly is engaged in the casing A, the latter being generally accessible under the vehicle. The whole is placed in provisional position, the operation being completed on the first buffing having the effect of freeing said balls, so that the unit is supported between the surfaces A and 2 of the casing.

In normal operation and in buffing, that is to say in the case of a force or shock on the front support plate 19, the support plate 18 is supported on the bottom 1 of the casing containing the cartridge and the whole elastic assembly is compressed; the intermediate plate 20 retracted at the same time as the bars 34 and the shackle 4, with a travel practically equal to half the total travel since it corresponds to compression of the stack 16, which is half the total assembly compressed.

In any case, damping is obtained by the compression at the same time of the unit 16 and of the unit 17.

In traction, that is to say when the shackle 4 is urged towards the front by the coupling hook, the plate 19 being urged onto another frontal fixed part 2 of the casing or of the vehicle, the shackle 4, through its inner bottom 22, thrusts towards the front at the same time the plate 18 and the bars 34, which push the intermediate plate 20, thus compressing the rubber plates of the half-cartridge 17 against the fixed frontal part 19, whilst the half-cartridge 16 is moved as a unit with the parts 18, 34 and 20, without supporting the draft force. It can hence be seen that flexibility in the direction of draft is twice as weak as in the direction of buff.

The ratio 1/2 generally sought by railways can also, and according to the invention, be modified; it suffices that the number p of elements of the half-stack 17 be different from the number q of the elements of the half-stack 16; the ratio of elasticity is then $p/p + q$ and can thus be made equal to any fraction (obviously smaller than 1).

Such an assembly has numerous advantages with respect to pre-existing systems of the type concerned, especially:

entirely positive guidance, complete safety against phenomena of buckling of the rubber stacks, the possibility of ensuring the isolation of one element of a stack, whatever the nature of the shackle of the coupling head, and the possibility of causing the ratio of flexibility between draft and buff to vary at will, since this ratio can be modified simply by acting on the number of elastic plates and on the length of the bars 34, independently of the nature of the abovesaid shackle.

As is self-evident, and as emerges already from the foregoing, the invention is in no way limited to those of its types of application and embodiments which have been more especially envisaged; it encompasses, on the contrary, all modifications.

I claim:

1. Vehicle coupling system, especially for railway vehicles, comprising in combination: a damping device constituted essentially by two stacks of plates of rubber or other elastomer and guide means incorporated in said system, said guide means being arranged to oppose lateral buckling of the stacks, said two stacks being supported on a common intermediate support plate and on two end support plates, wherein the guide means of the stacks comprise a U-shaped device whose base is rigidly fixed to the front plate, in combination with connecting bars fast to the common intermediate support plate and becoming engaged, in mounting position, respectively on the end of the wings of the U-shaped device and on the opposite end support plate, whilst being slidable axially with respect to said wings and said plate, under the effect of the forces to be damped.

2. System according to claim 1, wherein the connecting bars have T-shaped ends engagable in free spaces provided respectively at the end of the device and in the corresponding end support plate.

3. System according to claim 1, with stacks of which one is placed out of operation on the application of draft forces to the coupling, wherein the shackle receiving the draft force transmits, through its bottom in contact with one of the end support plates, the buff on the bars connecting said plate to the intermediate support plate, so that said force is transmitted only, by means of said bars to the stack arranged between said intermediate plate and the other end support plate.

4. Coupling system, especially for railway vehicles, of the type using a damping unit constituted by plates of rubber stacked between end support plates normally in contact with the edges of a casing provided in the vehicle to receive the unit, said unit being urged by a coupling shackle surrounding it to transmit the thrust or traction forces, a U-shaped element having arms whose surfaces slide along inside the shackle, and of which the edges slide also between the corresponding walls of the casing, one of said end support plates being fast to said U-shaped element, and bar elements mounted in sliding manner inside guides formed in said arms providing a supplementary connection between the other said end support plate and said arms.

5. System according to claim 4, wherein the bar elements have one end fixed on a support plate intermediate between the end support plates, whilst the other end can, either slide with respect to an end support plate, when the coupling works in thrust, or abut against the other end support plate by being drawn with it and immobilising a part of the unit, when the coupling works in traction.

6. System according to claim 5, wherein the bar elements have, at least on the side of said arms, a T-shaped form with, in said arms, staggered guide surfaces cooperating respectively with the body of the T and with the edges of the transverse of the T.

7. System according to claim 4, wherein the unit is subjected to precompression which is contained by said bar elements of length calculated for this purpose.

8. System according to claim 4, wherein at the moment of assembly the unit is subjected to precompression such, by the insertion of wedges cooperating with the transverse of the T of the connecting bars, that the length of the unit is then a little less than the corresponding length of the unit intended to receive it, said wedges being releasable on the first compression of the units under the effect of a thrust.

* * * * *